(12) United States Patent
Flokstra et al.

(10) Patent No.: US 6,799,875 B2
(45) Date of Patent: Oct. 5, 2004

(54) VEHICLE INTERIOR LIGHT

(75) Inventors: Thomas Flokstra, Hamilton, MI (US); Stephen Grant, Holland, MI (US); Michael Lanser, Holland, MI (US)

(73) Assignee: Innotec Corporation, Zeeland, MI (US)

( * ) Notice: Subject to any disclaimer, the term of this patent is extended or adjusted under 35 U.S.C. 154(b) by 32 days.

(21) Appl. No.: 10/251,430

(22) Filed: Sep. 20, 2002

(65) Prior Publication Data

US 2004/0057246 A1 Mar. 25, 2004

(51) Int. Cl.[7] .............................. B60Q 3/02; F21V 5/00; F21V 23/04
(52) U.S. Cl. ...................... 362/521; 362/394; 362/488
(58) Field of Search ................................ 362/244, 374, 362/375, 394, 488, 490, 520–522; 200/310–317, 337, 343

(56) References Cited

U.S. PATENT DOCUMENTS

| | | | |
|---|---|---|---|
| 2,673,914 A | 3/1954 | Sundt | 200/313 |
| 3,671,739 A | 6/1972 | McCain | 362/295 |
| 4,163,883 A * | 8/1979 | Boulanger | 200/314 |
| 4,678,872 A | 7/1987 | Gutman | 200/5 R |
| 5,136,485 A | 8/1992 | Muller | 362/488 |
| 5,239,449 A | 8/1993 | Wnuk et al. | 362/490 |
| 5,272,603 A | 12/1993 | Camarota et al. | 362/95 |
| 5,357,408 A | 10/1994 | Lecznar et al. | 362/490 |
| 5,441,339 A | 8/1995 | Mathias et al. | |
| 5,475,577 A | 12/1995 | Vanderhoof et al. | 362/363 |
| 5,491,313 A | 2/1996 | Bartley et al. | 200/310 |
| 5,718,326 A * | 2/1998 | Larose et al. | 200/314 |
| 5,734,137 A * | 3/1998 | Wakefield | 200/313 |
| 5,868,491 A | 2/1999 | Moore | 362/295 |
| 6,040,534 A * | 3/2000 | Beukema | 200/314 |
| 6,092,917 A | 7/2000 | Litke et al. | 362/490 |
| 6,129,446 A | 10/2000 | Hornung | 362/394 |
| 6,153,844 A * | 11/2000 | Hyono et al. | 200/343 |
| 6,260,936 B1 | 7/2001 | Frank et al. | 312/201 |
| 6,273,593 B1 | 8/2001 | Yabata et al. | 362/488 |

* cited by examiner

Primary Examiner—Alan Cariaso
(74) Attorney, Agent, or Firm—Price, Heneveld, Cooper, DeWitt & Litton, LLP

(57) ABSTRACT

A push lens is integrated with a bezel and connected to the bezel by an integrally formed hinge to allow the lens to deflect for actuating a switch.

16 Claims, 4 Drawing Sheets

VEHICLE INTERIOR LIGHT

BACKGROUND OF THE INVENTION

The present invention pertains to a vehicle interior light assembly, and particularly to one with a lens which can be pushed to activate the light.

Automobile interior lights are typically mounted in the headliner of a vehicle to provide interior light under low ambient light conditions. These lights are typically actuated by a switch on an exposed bezel in which the lamp is mounted. Some lamp assemblies have an individual lens which can be pushed to actuate an associated switch. Also, some lamp assemblies have dual lamps with a separate fixed lens covering each lamp, requiring two switches. A common problem with these lamp assemblies is the multitude of parts necessary to mount the switch(es) to a bezel or lamp base in addition to the lens, and, in some assemblies, there is a need to mount a separate lens for each lamp. Thus, it is costly and inefficient to mount switches and lenses for each lamp.

An alternative approach has been to use a push lens, which pivots on an axis at one end and rests on a switch at the other end. However, such push lenses typically require multiple pieces which are costly, create multiple edges, and do not provide a smooth surface between the lenses. Other push lenses have been suggested which contain separate components for each lens, components which form a separate hinge for each lens, as well as parts that connect each lens to the hinge as well as the bezel.

There exists a need, therefore, for a push lens which is relatively inexpensive, integrated as one piece, and which is capable of providing a source of light for the interior of a vehicle. There also exists a need for a push lens that has improved gap quality between the lens(es) and bezel as well as consistency in the overall quality of the part. Further, with the increasing sensitivity to the cost of vehicle components by manufacturers, it is desirable to have a push lens which is relatively inexpensive, requires less materials, is easy to install, and relatively convenient to replace the light bulbs in the lamp assembly.

SUMMARY OF THE INVENTION

The integral push lens of the present invention solves the need for a relatively inexpensive push lens which has improved gap quality and is capable of satisfying the lighting needs of modern vehicles. It accomplishes this goal by providing an integral lens and bezel. The lens and bezel are joined by a flex point which acts as a hinge to activate a switch. The push lens has an undercut tab that remains below the bezel to activate an associated switch to turn on or off a light source positioned behind the lens.

Lamp assemblies embodying the present invention include a housing having sockets that receive light sources such as lamps, LEDs or the like. The integral push lens and bezel is fastened to the housing and covers the light source which is activated by pressing the push lens which pivots around an integrally molded hinge.

These and other features, advantages and objects of the present invention will be further understood and appreciated by those skilled in the art by reference to the following specification, claims and appended drawings.

DETAILED DESCRIPTION OP THE PREFERRED EMBODIMENT

Figure 1:
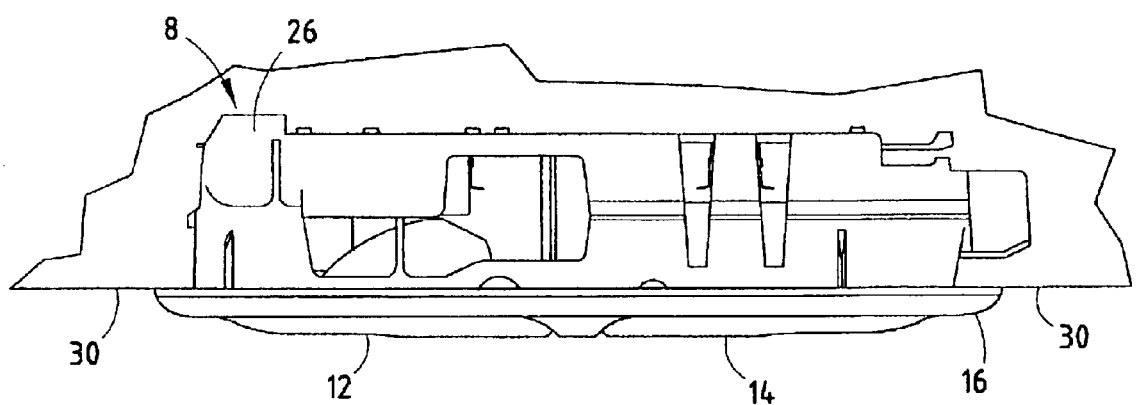
FIG. 1 is a fragmentary side elevational view of a lamp assembly with a dual push lens embodying the present invention.

Referring initially to FIG. 1, there is shown a lamp assembly 8 embodying the present invention. Assembly 8 includes a housing 26 and an integral dual push lens 10. The lamp assembly 8 is attached to the headliner 30 or overhead console of a vehicle using conventional fastening techniques. Lens 10 integrally includes a left lens 12 and right lens 14 and a bezel 16.

Figure 2:
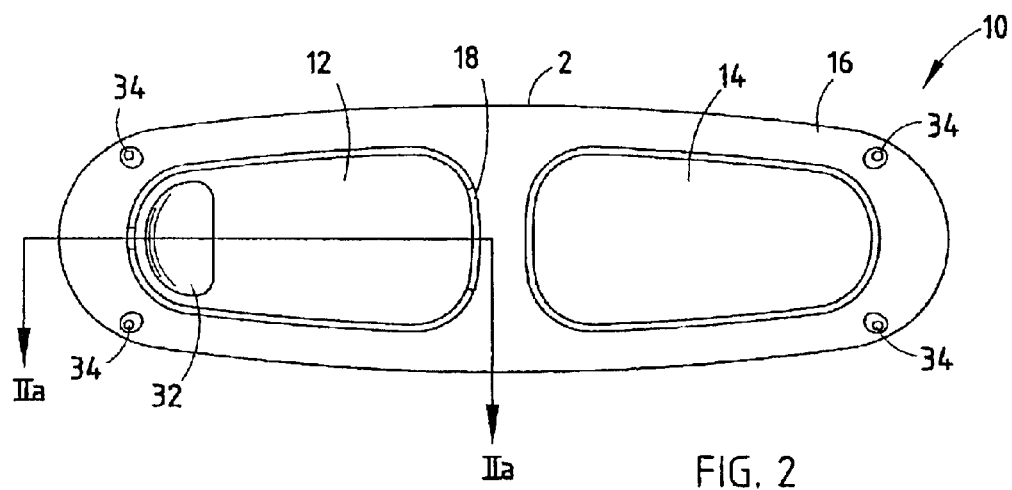
FIG. 2 is a top plan view of the dual push lens of FIG. 1.
Figure 5:
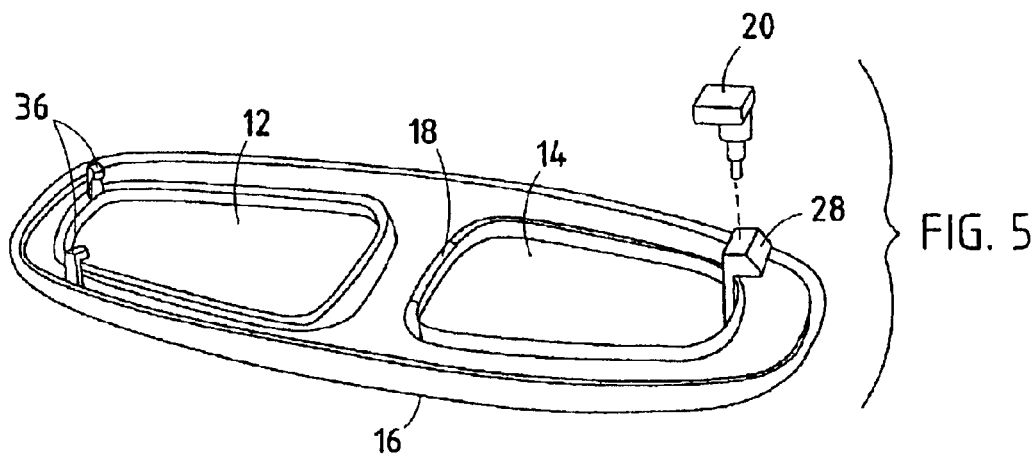
FIG. 5 is a top perspective view of the dual push lens of FIG. 1.

The left lens 12 pivots on integrally molded hinge 18 to activate a switch 20 (FIG. 5). The right lens 14 does not pivot or activate a switch but is also integrally molded with the bezel 16 (FIG. 2). The integral lens 10 is attached to the housing 26 by fasteners 34 which may be screws or any other suitable fastener which allows the integral lens 10 to be attached to and removed from the housing 26.

Figure 2A:
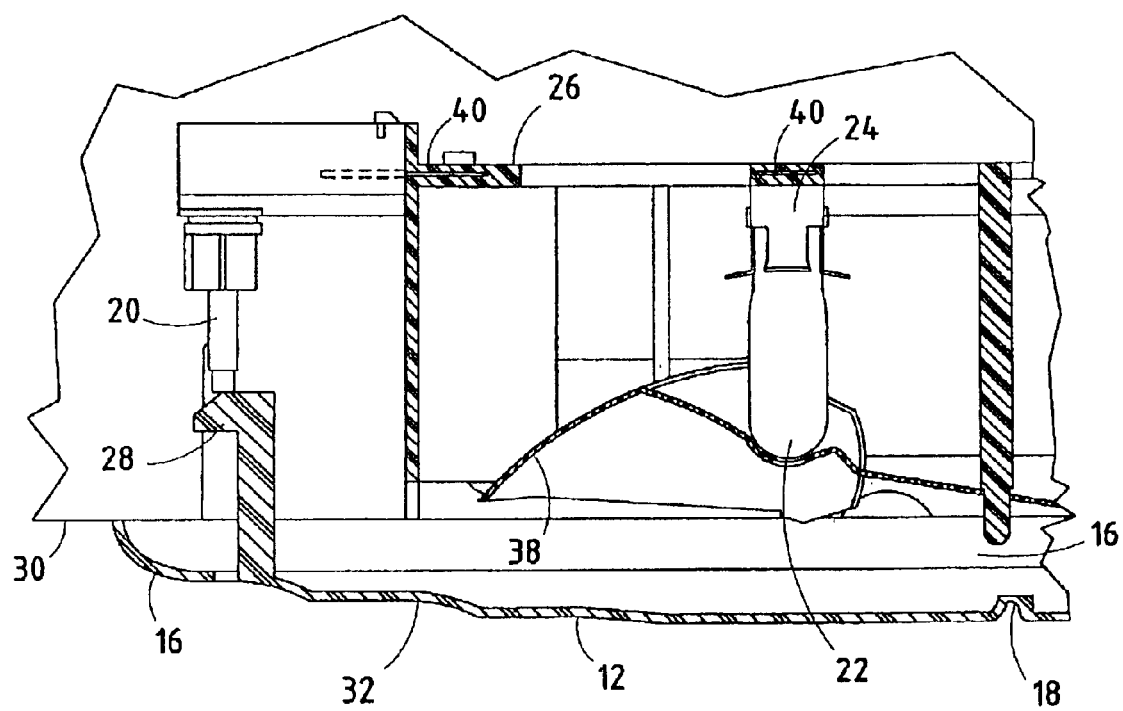
FIG. 2A is an enlarged cross-section of the dual push lens of FIG. 1, taken along section line IIa—IIa of FIG. 2.
Figure 3:
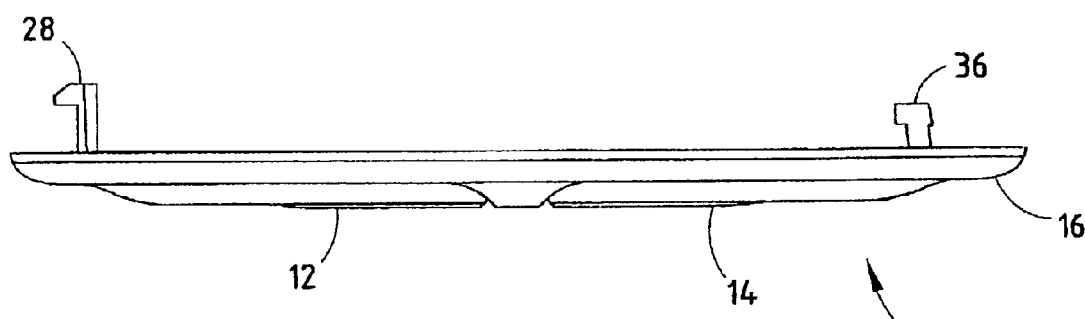
FIG. 3 is a side elevational view of the dual push lens of FIG. 1.
Figure 4:
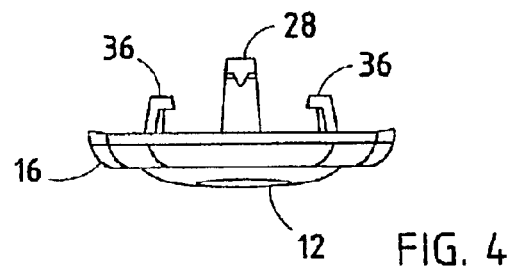
FIG. 4 is a left end view of the dual push lens of FIG. 1.

Light sources 22 such as a lamp LED or the like are mounted in a socket 24 of housing 26 and covered by the integral lens 10 as seen in FIG. 2A. The light source 22 is positioned with a reflector 38 which is connected to the housing 26 and serves to reflect light produced by the light source 22 such that the corresponding lenses 12 and/or 14 are illuminated in an efficient manner. The light sources 22 may be activated when the door of the vehicle is opened or alternatively by depression of the left lens 12 which has an undercut tab 28 that positions the left lens 12 with respect to the bezel 16 while activating an aligned switch 20 when the press area 32 (FIG. 2) is actuated. The switch 20 is mounted to the housing 26 such that it may be activated by the undercut tab 28 of the integral dual push lens 10 to supply electrical power from the vehicle's electrical system to the light source 22 within socket 24.

The housing 26 is integrally molded of a suitable polymeric material such as polycarbonate and includes an electrical circuit 40 which allows the switch 20 to activate the light source 22 through the lamp socket 24. The housing 26 also includes a plurality of apertures for attaching the housing 26 to the supporting roof structure of a vehicle using threaded fasteners.

Figure 6:
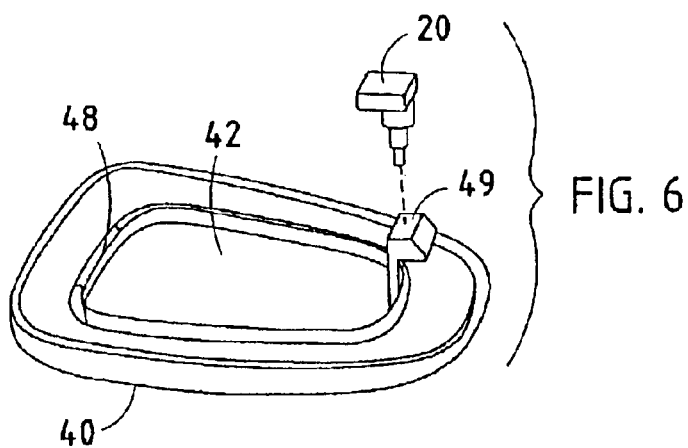
FIG. 6 is a top perspective view of a single push lens embodying the present invention.

In another embodiment (FIG. 6), a single lens 42 is attached to the bezel 40 by an integrally molded hinge 48. The undercut tab 49 activates a switch 20 when a press area (such as area 32 in the first embodiment) of lens 42 is compressed.

Figure 7:
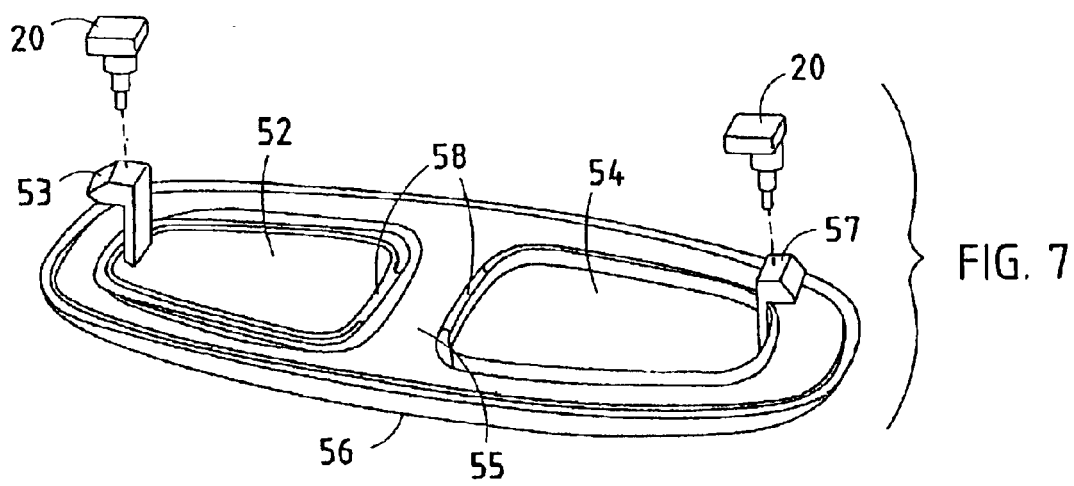
FIG. 7 is a top view of a double push lens embodying the present invention.

In an alternative embodiment (FIG. 7), a left lens 52 pivots on an integrally molded hinge 58 to activate a switch 20 by an undercut tab 53. Similarly, the right lens 54 pivots around a similar integrally molded hinge 58. Each lens has a press area (such as area 32 in the first embodiment) which is pressed to activate a corresponding switch 20. When the press area on the left lens 52 is actuated, switch 20 is actuated by the undercut tab 53 to turn the light source on or off. When the press area on the right lens 54 is actuated, switch 20 is activated by an undercut tab 57 to turn a light source on or off.

The left integrally molded hinge 58 and the right integrally molded hinge 58 meet at the middle section 55 of bezel 56. The undercut tabs 53, 57 rest above the bezel 56 to assist in activating the respective switches 20.

Figure 8:
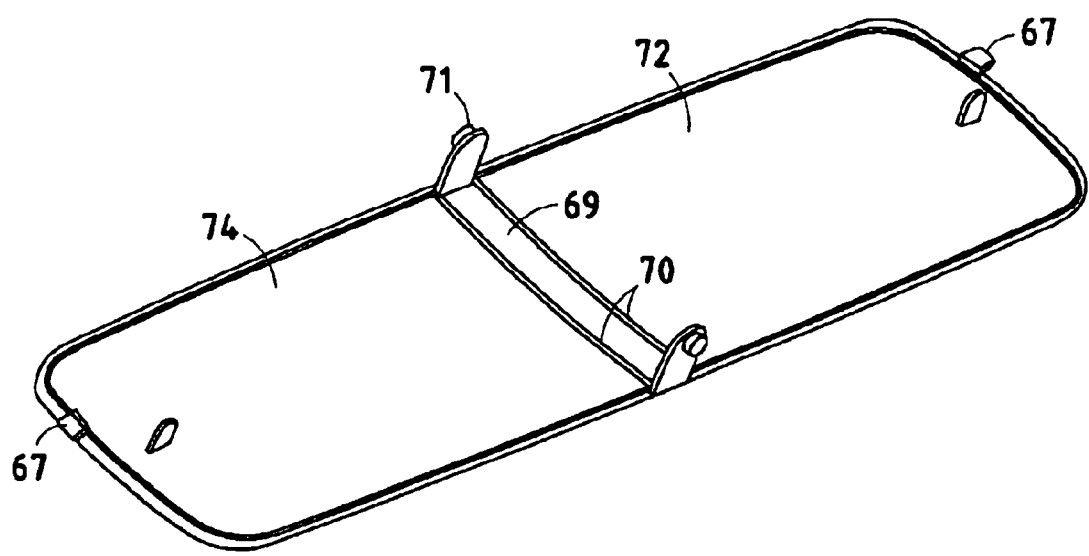
FIG. 8 is a top perspective view of a double push lens embodying the present invention.

In an alternative embodiment (FIG. 8), a left lens 74 pivots on an integrally molded hinge 70 to activate a switch by an undercut tab 67. Similarly, the right lens 72 pivots around the same integrally molded hinge 70 to activate a switch by an undercut tab 67. The integral lens is attached to a housing by buttons 71 located at or near the molded hinge 70. The area between the left lens 74 and the right lens 72 acts as the bezel 69. When the press area of the left lens 74 is actuated, a switch is actuated by the undercut tab 67 to turn the light source on or off. When the press area of the right lens 72 is actuated, a switch is activated by the undercut tab 67 to turn a light source on or off.

The light sources 22 that are placed beneath the integral lens in each embodiment are serviced by removing the bezel 16 from the housing 26. The hinges that connect the bezel 16 to the left lens 12 and/or the right lens 14 are approximately 0.5 to 2.0 mm thick. The integral lens 10 is comprised of a polycarbonate material, however, various materials including, but not limited to, acrylic, may be used so long as the material is capable of allowing the light source 22 to illuminate the interior of a vehicle through each lens while allowing the integrally molded hinge 18 to move the lens with respect to the bezel 16 to actuate the switches 20 for light sources 22.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A light for vehicles, comprising:
   a one piece bezel and lens including an integral hinge formed between said lens and said bezel;
   a light source adjacent said lens;
   a lighting switch that turns said light source on and off, and wherein:
   the lens moves about said integral hinge and activates said lighting switch to selectively turn the light source on and off.

2. The light of claim 1, wherein a plurality of lenses are integrally formed with said bezel.

3. The light of claim 1, wherein said lens has a tab extension which remains above a portion of said bezel to activate a lighting switch.

4. The light of claim 1, wherein said lens and bezel is molded of polycarbonate.

5. A light for vehicles, comprising:
   a bezel including a plurality of integral lenses forming one piece;
   wherein said plurality of lenses are coupled to said bezel by integrally formed hinges;
   at least one light source supplying light to the lenses;
   at least one light switch that is actuated upon deflection of at least a selected one of the lenses to selectively turn the at least one light source on and off.

6. The light of claim 5, wherein two lenses are integrated with said bezel as one piece.

7. The light of claim 6, wherein said integrally formed hinges are formed at a midpoint in said bezel.

8. The light of claim 5, wherein said plurality of lenses and bezel are molded of polycarbonate.

9. A vehicle interior lamp assembly comprising:
   a lamp housing for mounting to the interior of a vehicle;
   a light source mounted to said housing;
   a one piece lens and bezel fastened to said housing;
   a light switch mounted to said housing; and
   wherein said lens pivots with respect to an integral hinge formed between said lens and said bezel and activates said light switch to selectively turn the light source on and off.

10. The lamp assembly of claim 9, wherein a plurality of lenses are integrally formed with said bezel.

11. The lamp assembly of claim 10, wherein said plurality of lenses include tab extensions that remain above a part of said bezel to actuate a plurality of associated light switches.

12. The lamp assembly of claim 9, wherein said lens and bezel is made of a polycarbonate.

13. The lamp assembly of claim 9, wherein said bezel is fastened to said lamp housing by screws.

14. A light for vehicles, comprising:
   a one piece dual lens including a left lens and a right lens;
   at least one light source;
   a lighting switch;
   wherein said one piece dual lens includes at least one integral hinge formed between said left lens and said right lens, said left lens and said right lens to deflect for activating said lighting switch and selectively turning the at least one light source on and off upon deflection of said left lens and said right lens.

15. The light of claim 14, wherein said left lens has a tab extension which activates a lighting switch.

16. The light of claim 14, wherein said right lens has a tab extension which activates a lighting switch.

* * * * *